United States Patent [19]
Vincent

[11] Patent Number: 5,175,457
[45] Date of Patent: * Dec. 29, 1992

[54] LINEAR MOTOR OR ALTERNATOR PLUNGER CONFIGURATION USING VARIABLE MAGNETIC PROPERTIES FOR CENTER ROW AND OUTER ROWS OF MAGNETS

[75] Inventor: Ronald J. Vincent, Latham, N.Y.

[73] Assignee: Mechanical Technology Incorporated, Latham, N.Y.

[*] Notice: The portion of the term of this patent subsequent to Jun. 26, 2007 has been disclaimed.

[21] Appl. No.: 782,981

[22] Filed: Oct. 28, 1991

[51] Int. Cl.$^5$ .......................................... H02K 33/00
[52] U.S. Cl. ...................................... 310/15; 310/12; 310/13
[58] Field of Search ...................... 310/15, 12, 13, 254

[56] References Cited

U.S. PATENT DOCUMENTS

| | | | |
|---|---|---|---|
| 4,454,426 | 6/1984 | Benson | 290/1 R |
| 4,623,808 | 11/1986 | Beale et al. | 310/15 |
| 4,827,163 | 5/1989 | Bhate et al. | 310/15 |
| 4,831,292 | 5/1989 | Berry | 310/15 |
| 4,937,481 | 6/1990 | Vitale | 310/15 |
| 5,038,061 | 8/1991 | Olsen | 310/15 |

Primary Examiner—Steven L. Stephan
Assistant Examiner—Matthew Nguyen
Attorney, Agent, or Firm—Kane, Dalsimer, Sullivan, Kurucz, Levy, Eisele and Richard

[57] ABSTRACT

The apparatus pertains to an electromagnetic reciprocating machine with a stator having end portions forming axially spaced-apart pole pieces, the stator further including a coil cavity. A plunger reciprocates within the stator and includes a central portion and two end portions. The magnetic strength of the end portions is different from the magnetic strength of the central portion.

14 Claims, 2 Drawing Sheets

LINEAR MOTOR OR ALTERNATOR PLUNGER CONFIGURATION USING VARIABLE MAGNETIC PROPERTIES FOR CENTER ROW AND OUTER ROWS OF MAGNETS

BACKGROUND OF THE INVENTION

1. Field of the Invention

The present invention relates generally to an electromagnetic machine for converting mechanical energy into electrical energy and vice versa. In particular, the present invention relates to a reciprocating linear electromagnetic machine comprising a stator, a coil mounted in the stator for generating magnetic flux, and a plunger having a configuration of variable magnetic properties for the center and outer rows of magnets arranged for reciprocation with respect to the stator.

2. Description of the Prior Art

Linear electromagnetic machines are known which comprise a stator having a plurality of axially spaced coils for generating a magnetic flux and a permanent magnet plunger reciprocating with respect to the stator. Examples of such machines are found in U.S. Pat. Nos. 4,349,757 to Bhate and 4,454,426 to Benson. A machine employing a single coil mounted in the stator is disclosed in U.S. Pat. No. 4,827,163 to Bhate and Vitale. Similarly, U.S. Pat. No. 4,937,481 to Vitale discloses a linear electromagnetic machine including a plunger having a plurality of magnetic segments disposed axially and of alternating polarity (i.e., the term "magnetic strength" as used herein shall refer to the 'absolute' magnitude and not the polarity of the magnet).

Magnetic self-centering of the moving magnet plunger in a linear motor is highly desirable so that start-up will occur from the mid-stroke position and will occur without hitting the end-of-stroke stops. In a typical three-magnet design, such as disclosed in U.S. Pat. No. 4,937,481, the two wing magnets extend beyond the pole pieces of the outer stator when the plunger is at mid-stroke. As a result, this configuration is self-centering because of flux leakage from the portions of the wing magnets that extend beyond the outer stator.

Typically, all three magnets are made from the same high strength permanent magnet material which is usually quite expensive. However, the center magnet is the one that is most effective in providing the flux changes needed in the motor to generate power when the coil is energized with AC current. Eliminating the wing magnets, or reducing their strength significantly, will not drastically reduce the motor's power capability or efficiency, but wing magnets of some strength are needed to provide the plunger with self-centering capability. If weaker wing magnets are substituted, then the motor could be brought back to full power capability by using a somewhat stronger magnet in the center position. If substantially different performance or behavior is desired, then the magnet in the center position could be of lower strength relative to the wing magnets or could be replaced by either high permeability material or by an air gap (or material having magnetic properties similar to an air gap).

It is therefore an object of this invention to reduce the magnetic strength, and hence the cost, of the wing magnets or center magnets of a linear motor or alternator.

SUMMARY OF THE INVENTION

This and other objects of the invention are achieved by providing a linear reciprocating electromagnetic machine comprising a stator, a coil mounted in the stator for generating magnetic flux, and a plunger having a configuration of variable magnetic properties for the center and outer rows of magnets arranged for reciprocation with respect to the stator. Furthermore, this invention uses weaker, less expensive material, such as ferrites, for the wing magnets of a linear motor or alternator. Similarly, the wing magnets may be replaced by high permeability material if the strength of the center magnet is increased. This plunger configuration without wing magnets would not exhibit self-centering, and auxiliary centering means would probably be required.

Alternately, the permanent magnet in the center position of a linear motor or alternator may be dispensed with and replaced by either an air gap (or material with magnetic properties similar to an air gap) or a high permeability material such as laminated iron or ferrite core material. Structural integrity of the plunger normally would rely on structural elements other than the magnet, air gap, or laminated iron materials. This plunger configuration would retain the self-centering characteristics of a three-magnet configuration.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 3:
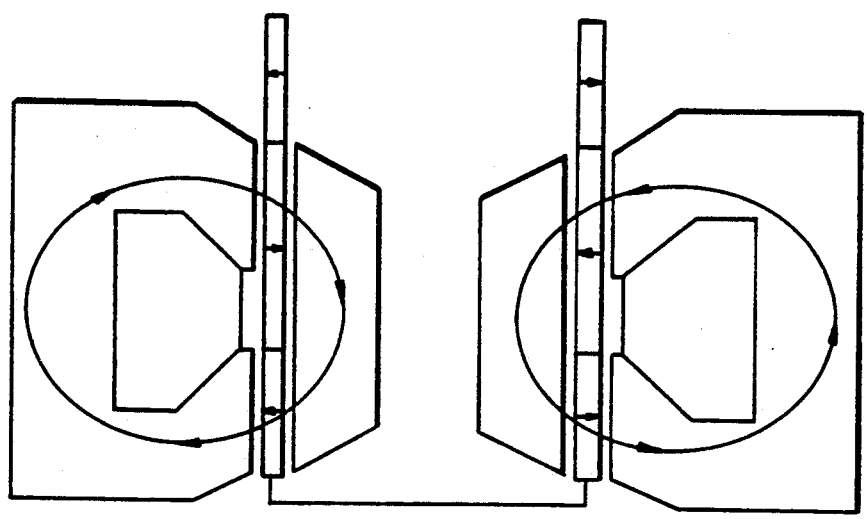
FIG. 3 shows a schematic side sectional view of a machine constructed in accordance with a first embodiment of this invention with the plunger in a second extreme position.
Figure 2:
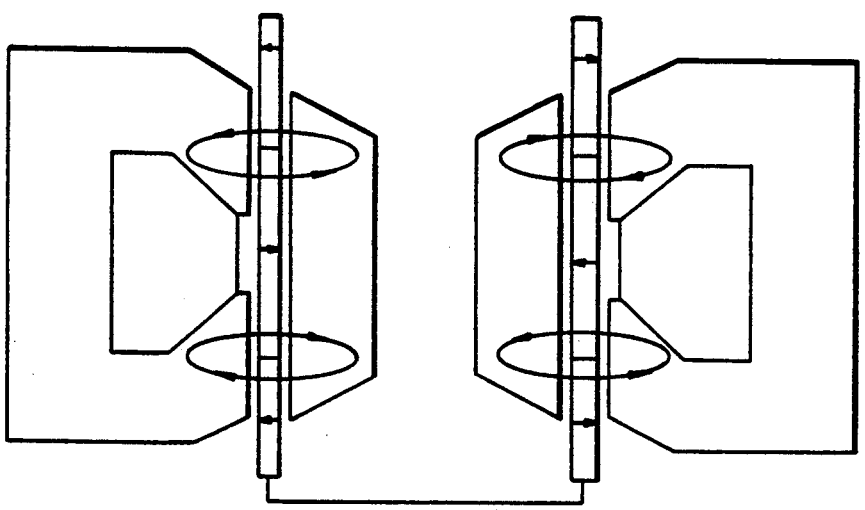
FIG. 2 shows a schematic side section view of a machine constructed in accordance with a first embodiment of this invention with the plunger in a center position.
Figure 1:
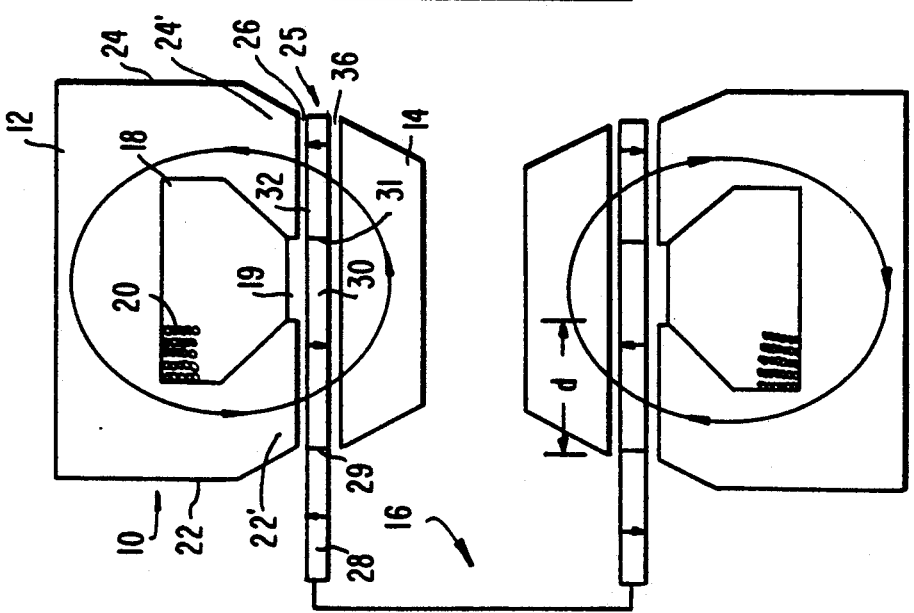
FIG. 1 shows a schematic side sectional view of a machine constructed in accordance with a first embodiment of this invention with the plunger in a first extreme position.

Referring now to the drawings in the detail wherein like numerals refer to like elements throughout the several views, FIGS. 1-3 disclose a linear reciprocating machine 10 comprising an outer stator 12, an inner stator 14 and a plunger 16 disposed within the space therebetween. The stators 12, 14 and the plunger 16 are constructed and arranged so that the plunger may be moved axially in a reciprocating motion with respect to the stators 12, 14 or vice versa. Preferably, the stators are made of a material having very high magnetic permeability such as magnetic steel. In order to eliminate circumferential eddy currents, the stators are formed of radial laminations. To achieve the most efficient machine none of the other components must be of high conductivity or magnetic materials. That is, the support structure and any internal components should be constructed of materials which are non-magnetic and of high resistivity.

The outer stator 12 is made from radial laminations stacked in such a manner as to form a cylindrical body with an annular cavity 18 having an open-slot 19 for housing a single toroidal coil 20 (the advantages of open-slot 19 are explained in detail in U.S. Pat. No. 4,937,481). The laminations are C-shaped with extending legs 22, 24 and an opening which forms the coil cavity 18. The width of lamination is determined by the amount of flux it has to carry. When the laminations are stacked to form the outer stator 12, the tips of the C-shaped laminations form a pair of axially spaced apart pole pieces 22' and 24' each having an axial length "d" which is related to the design stroke. The pole pieces 22' and 24' form a space 25 with the inner stator 14.

Plunger 16 comprises wing segments 28, 32 on both sides of central segment 30. Segments 28, 30, 32 are ordinarily magnetized radially and of alternating polarities. The segments 28, 30, 32 are arranged such that the interface zones 29, 31 between the segments are substantially within the region defined by the pole pieces 22' and 24' for most operating axial positions of the plunger 16. The plunger 16 is disposed within the space 25 defined between the pole pieces 22' and 24' of outer stator 12 and the inner stator 14 and define air gaps 26 and 36 on opposite sides of the magnet segments 28, 30 and 32.

In the primary and first embodiment of this invention as shown in FIGS. 1-3, the central segment 30 is composed of a material having high magnetic strength such as samarium cobalt or neodymium-iron-boron (both belonging to the class called rare earth magnets) while the wing segments 28, 32 are composed of a weaker, less expensive magnetic material such as a ferrite. Since such materials are usually fairly weak structurally and mechanically, the magnets are preferably secured to a suitable mounting member (not shown) made of a non-magnetic, high resistivity material.

Figure 4:
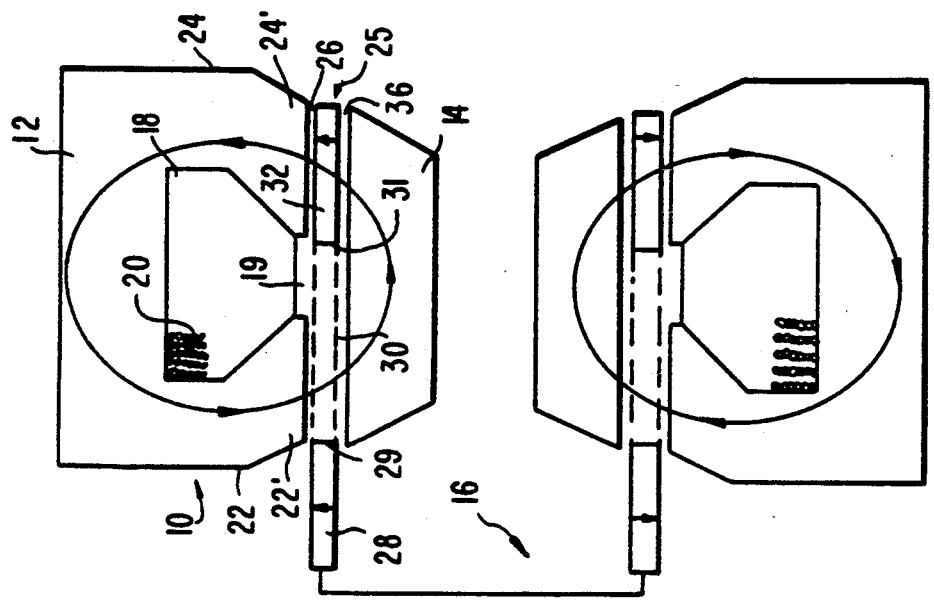
FIG. 4 shows a schematic side sectional view of a machine constructed in accordance with a second embodiment of this invention with the plunger in a first extreme position.

In a second embodiment of this invention as shown in FIG. 4, the wing segments 28, 32 are replaced by a non-magnetic, high permeability material such as laminated iron or ferrite core material. However, significant magnetic centering force could not be expected with this configuration and auxiliary centering means 33 is required.

Figure 5:
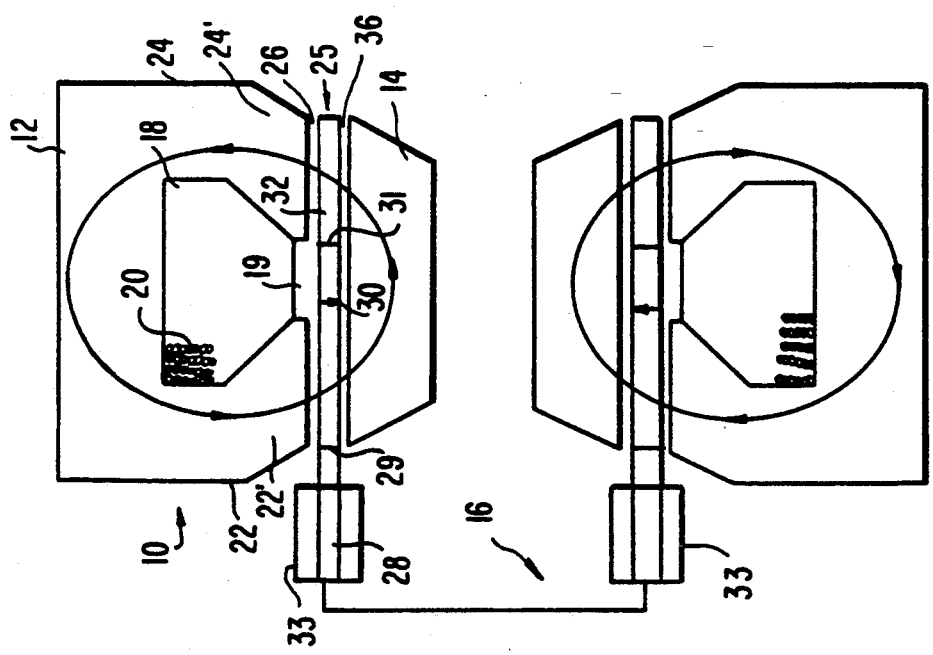
FIG. 5 shows a schematic side section view of a machine constructed in accordance with a third embodiment of this invention with the plunger in a first extreme position.

In a third embodiment of this invention as shown in FIG. 5, the central segment 30 is replaced by an air gap while wing segments 28, 32 are made of a highly magnetic material such as samarium cobalt. An alternative third embodiment of this invention uses a central segment of nonmagnetic, high permeability material while wing segments 28, 32 are made of a highly magnetic rare earth magnet material such as samarium cobalt. Significant magnetic centering force would be present in either of these configurations since wing magnets are used.

Air gaps 26 and 36 separate the plunger 16 from the outer and inner stators 12 and 14. In the first embodiment, the wing magnets 28 and 32 are magnetized in a first direction, while the central magnet 30 is magnetized in the opposite direction. The wing magnets 28, 32 are of equal axial lengths while central magnet 30 has an axial length greater than that of wing magnets 28, 32. Preferably, central magnet 30 is longer than wing magnets 28, 32 by an amount equal to the axial length of slot 19.

Ideally, magnets 28, 30, 32 should be magnetized radially. Alternatively, radial orientations can be approximated by using a large number of magnet segments of rectangular shape arranged to form a ring with approximately radial orientation. Various configurations for structurally forming such rings and holding them at approximate axial locations with respect to each other may be employed. Also since for many applications the mass of the reciprocating plunger should be kept to a minimum in order to minimize the inertial forces during reciprocating movement, the arrangement should aim for high structural integrity and minimum mass. A suitable arrangement is shown and described in the aforementioned U.S. Pat. No. 4,827,163.

The explanation of the machine working as a force actuator requires recourse to the technique of energy gradient or what is customarily known as the "principle of virtual displacement". In the application of this technique, changes in the energy associated with the overall system are obtained as the plunger undergoes an infinitesimal displacement. The force exerted on the surrounding is then obtained as the rate of change of work component of the total energy with respect to the displacement. While such an approach is necessary to obtain quantitative information, it is rather involved to obtain an appreciation of the working of the machine as a motor.

Perhaps the simplest way to gain such appreciation is to recognize that an electromagnetic device, such as the one under consideration, is merely an energy conversion device. Thus, it can work as a motor, if electrical energy is inputted, converting it to a mechanical form and it can work as an alternator, if mechanical energy is inputted converting it to electrical form. It so happens, that in some instances one of the modes of operation is much more readily described and understood. The explanation of the operation of the machine of this invention as an alternator is very straight-forward only requiring application of Faraday's Law of Induction. For example, when the permanent magnet plunger 16 reciprocates relative to the stators 12, 14, the flux linking the coil changes. This change of flux causes a voltage to be induced in the coil.

This operation can be seen in more detail with the help of FIGS. 1 through 3.

FIG. 1 shows the plunger 16 in the extreme left position along with the flux paths. Note that the flux linking in the coil is counterclockwise. FIG. 3 shows the plunger 16 in the extreme right position along with the flux paths. In this position, the flux linking the coil is clockwise. Thus, moving the plunger 16 from right to left causes the flux linkages of the coil to change from positive maximum to negative maximum. When the plunger is reciprocated between the left and right extremes the flux linkages of the coil also oscillate between the two extreme values. This variation of flux linkages, with respect to time, causes an AC voltage to be induced in the coil. The waveform of the induced voltage is obtained by differentiating this variation of flux linkages with respect to time.

The embodiments of FIGS. 4 and 5 operate similarly to the aforementioned embodiment of FIG. 1 through 3, except significant magnetic centering force could not be expected with the embodiment of FIG. 4 and auxiliary centering means 33 is required.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A linear electromagnetic reciprocating machine, comprising:
   a stator having end portions forming axially spaced-apart pole pieces, said stator further including a coil cavity;
   a coil mounted in said coil cavity;
   a plunger arranged for reciprocation with respect to said stator, wherein said plunger includes two outer portions spaced axially apart with a central portion axially adjacent to and between said two outer portions; wherein said two outer portions are of equal axial length and the central portion is axially longer than either of said outer portions, and such that adjacent ends of the outer and central portions define interface zones between said portions, said interface zones between said portions being substantially within a region defined by said stator pole pieces for most operating axial positions of said plunger; wherein said end portions are of equal magnetic strength to each other and wherein said central portion has a higher magnetic strength than said end portions; and
   flux return means associated with said stator for completing a magnetic circuit.

2. The linear electromagnetic reciprocating machine of claim 1 wherein said end portions are composed of ferrite magnets.

3. The linear electromagnetic reciprocating machine of claim 1 wherein said central portion is composed of rare earth magnets and said end portions are composed of ferrite magnets.

4. The linear electromagnetic reciprocating machine of claim 1 wherein said end portions are composed of high permeability material.

5. The linear electromagnetic reciprocating machine of claim 4 further including auxiliary centering means.

6. The linear electromagnetic reciprocating machine of claim 4 wherein said central portion is composed of rare earth magnets.

7. The linear electromagnetic reciprocating machine of claim 4 wherein said end portions are composed of a material selected from the group consisting of laminated iron and ferrite core material.

8. The linear electromagnetic reciprocating machine of claim 7 wherein said central portion is composed of rare earth magnets.

9. The linear electromagnetic reciprocating machine of claim 1 wherein said central portion is composed of a high permeability material.

10. The linear electromagnetic reciprocating machine of claim 9 wherein said central portion is composed of a material selected from the group consisting of laminated iron and ferrite core material.

11. The linear electromagnetic reciprocating machine of claim 10 wherein said end portions are composed of rare earth magnets.

12. The linear electromagnetic reciprocating machine of claim 9 wherein said end portions are composed of rare earth magnets.

13. The linear electromagnetic reciprocating machine of claim 1 wherein said end portions are composed of rare earth magnets.

14. The linear electromagnetic reciprocating machine of claim 1 wherein said end portions are composed of rare earth magnets.

* * * * *